United States Patent
Damnjanovic et al.

(10) Patent No.: US 8,477,699 B2
(45) Date of Patent: Jul. 2, 2013

(54) CROSS-CARRIER CONTROL FOR LTE-ADVANCED MULTICARRIER SYSTEM

(75) Inventors: Jelena M. Damnjanovic, Del Mar, CA (US); Wanshi Chen, San Diego, CA (US); Juan Montojo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 509 days.

(21) Appl. No.: 12/508,480

(22) Filed: Jul. 23, 2009

(65) Prior Publication Data

US 2011/0021191 A1   Jan. 27, 2011

(51) Int. Cl.
| | | |
|---|---|---|
| H04W 4/00 | (2009.01) | |
| H04W 72/00 | (2009.01) | |
| H04B 7/208 | (2006.01) | |
| H04J 9/00 | (2006.01) | |
| H04W 72/04 | (2009.01) | |
| H04L 5/00 | (2006.01) | |
| H04W 72/02 | (2009.01) | |

(52) U.S. Cl.
CPC ............ *H04W 72/04* (2013.01); *H04L 5/0007* (2013.01); *H04W 72/02* (2013.01)
USPC ........... 370/329; 370/341; 370/344; 370/204; 455/450

(58) Field of Classification Search
USPC ............... 370/204, 328, 329, 342, 344, 431, 370/341; 455/450
See application file for complete search history.

(56) References Cited

U.S. PATENT DOCUMENTS

| | | | |
|---|---|---|---|
| 2009/0052387 A1 | 2/2009 | Lee et al. | |
| 2009/0300456 A1* | 12/2009 | Pelletier et al. | 714/749 |
| 2010/0142455 A1* | 6/2010 | Imamura | 370/329 |
| 2010/0232373 A1* | 9/2010 | Nory et al. | 370/329 |
| 2010/0232382 A1* | 9/2010 | Gauvreau et al. | 370/329 |
| 2010/0254329 A1* | 10/2010 | Pan et al. | 370/329 |
| 2010/0279628 A1* | 11/2010 | Love et al. | 455/70 |
| 2010/0303039 A1 | 12/2010 | Zhang et al. | |
| 2011/0026473 A1 | 2/2011 | Luo et al. | |

(Continued)

FOREIGN PATENT DOCUMENTS

| | | |
|---|---|---|
| EP | 1944896 A1 | 7/2008 |
| WO | WO2008147123 A1 | 12/2008 |

OTHER PUBLICATIONS

Ericsson: "Downlink CoMP", 3GPP Draft, R1-090914 (DL CoMP}, 3rd Generation Partnership Project (3GPP), Mobile Competence Centre, 650, Route Des Lucioles, F-06921 Sophia-Antipolis Cedex, France, no. Athens, Greece, Feb. 4, 2009, XP050318755, [retrieved on Feb. 4, 2009].

(Continued)

*Primary Examiner* — Paul H Masur
(74) *Attorney, Agent, or Firm* — Paul Kuo

(57) ABSTRACT

Systems and methodologies are described that facilitates identifying control information for two or more carriers in a multi-carrier system or environment. User equipment (UE) identifications (IDs) can be assigned for a user equipment, wherein each user equipment (UE) identification (ID) can correspond to a specific carrier. Upon receipt of control information related to a plurality of carriers from an anchor carrier, the user equipment (UE) identifications (IDs) can be utilized in order to identify which control information corresponds to each carrier. The user equipment (UE) identification (ID) can be, for example, a Cell Random Network Temporary Identity (C-RNTI).

43 Claims, 11 Drawing Sheets

U.S. PATENT DOCUMENTS

2011/0116456 A1  5/2011  Gaal et al.
2011/0194501 A1  8/2011  Chung et al.
2012/0039179 A1  2/2012  Seo et al.

OTHER PUBLICATIONS

Huawei, Qualcomm Europe, RITT, CMCC: Solutions for DL CoMP Transmission—For Issues on Control Zone, CRS and DRS, 3GPP TSG RAN WGI Meeting 56, Feb. 9, 2009, pp. 1-9, XP002630581, Athens, Greece Retrieved from the Internet: URL:http://ftp.3gpp.org/tsg_ran/WGI_RLI/TS GRI_56/Docs/ [retrieved on Mar. 28, 2011].

Samsung: "Design Considerations for COMP Joint Transmission", 3GPP Draft, R1-091868 Design Considerations for CoMP Joint Transmission, 3rd Generation Partnership Project (3GPP), Mobile Competence Centre, 650, Route Des Lucioles, F-06921 Sophia-Antipolis Cedex, France, no. San Francisco, USA, Apr. 28, 2009, XP050339364, [retrieved on Apr. 28, 2009].

* cited by examiner

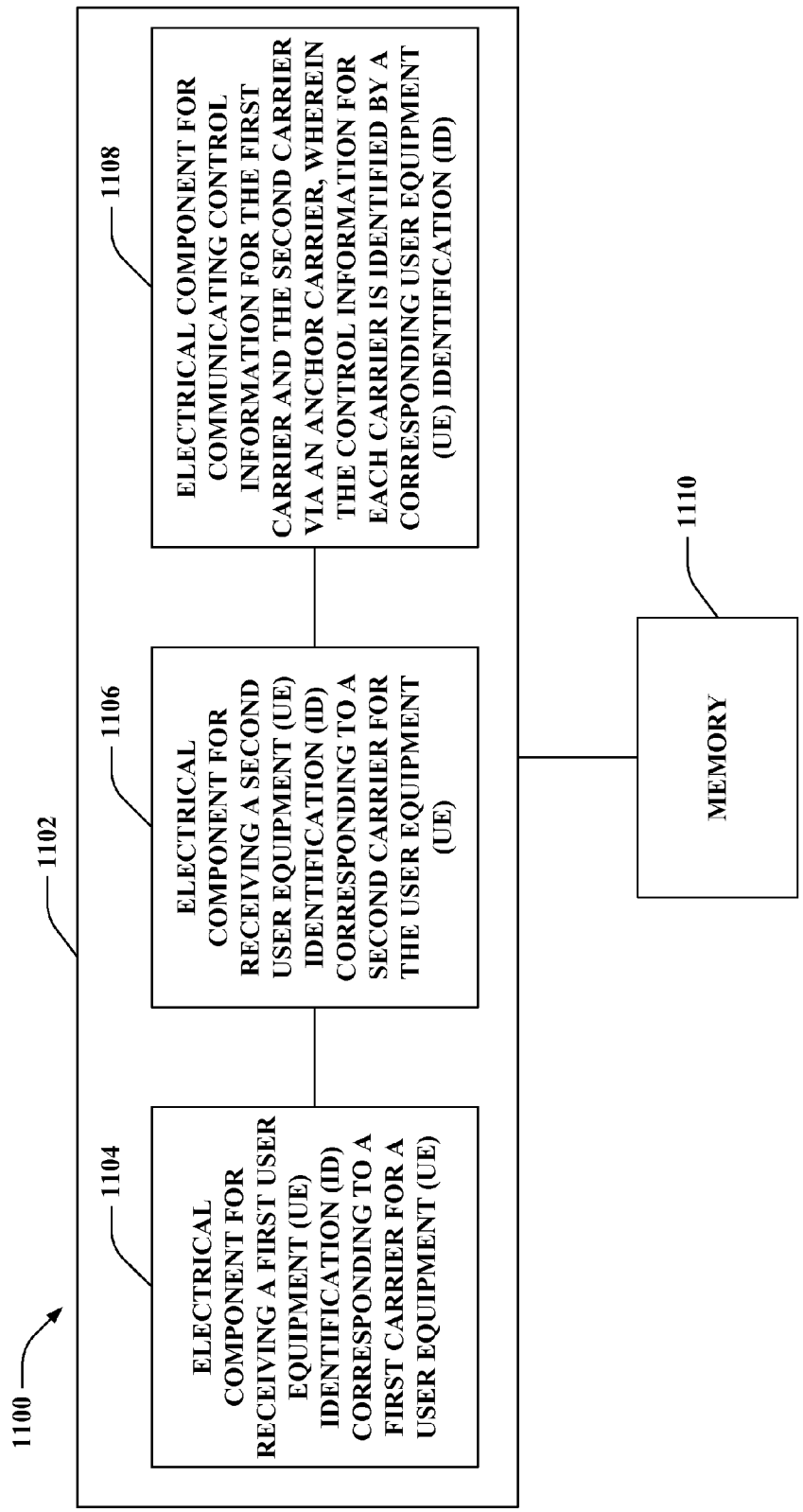

CROSS-CARRIER CONTROL FOR LTE-ADVANCED MULTICARRIER SYSTEM

BACKGROUND

I. Field

The following description relates generally to wireless communications, and more particularly to cross-carrier operation and distribution of cross-carrier control information for multiple carriers.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Area tracking within a wireless communication system enables a tracking area location for user equipment (e.g., mobile device, mobile communication apparatus, cellular device, smartphone, etc.) to be defined. Typically, a network can request or page the user equipment (UE) in which the UE can respond with such tracking area location. This enables the tracking area location of the UE to be communicated and updated to the network.

Multi-carrier systems often employ cross-carrier operations which provide good system performance. In harsh interference scenarios, control connectivity on impacted carriers is unreliable and absent. Moreover, control connectivity being absent can prevent data transmissions on these carriers. In other words, multi-carrier systems cannot distinguish for which carrier received control is applicable.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to related aspects, a method that facilitates identifying control information related to cross-carrier operation. The method can include assigning a first identification (ID) to a user equipment (UE) corresponding to a first carrier. Further, the method can include assigning a second identification (ID) to the user equipment (UE) corresponding to a second carrier. Moreover, the method can comprise receiving control information from an anchor carrier. The method can additionally include utilizing the assigned first identification (ID) to identify control information for the first carrier. Furthermore, the method can include utilizing the assigned second identification (ID) to identify control information for the second carrier.

Another aspect relates to a wireless communications apparatus. The wireless communications apparatus can include at least one processor configured to generate control information for a first carrier based upon a first user equipment (UE) identification (ID), generate control information for a second carrier based upon a second user equipment (UE) identification (ID), transmit control information for the first carrier using the first user equipment (UE) identification (ID) on an anchor carrier, and transmit control information for a second carrier using the second user equipment (UE) identification (ID) on the anchor carrier. Further, the wireless communications apparatus can include memory coupled to the at least one processor.

Yet another aspect relates to a wireless communications apparatus that enables identification of control information. The wireless communications apparatus can include means for assigning a first identification (ID) to a user equipment (UE) corresponding to a first carrier. Additionally, the wireless communications apparatus can comprise means for assigning a second identification (ID) to the user equipment (UE) corresponding to a second carrier. Further, the wireless communications apparatus can comprise means for receiving control information from an anchor carrier. Moreover, the wireless communications apparatus can comprise means for utilizing the assigned first identification (ID) to identify control information for the first carrier. Furthermore, the wireless communications apparatus can comprise means for utilizing the assigned second identification (ID) to identify control information for the second carrier.

Still another aspect relates to a computer program product comprising a computer-readable medium having stored thereon code for causing at least one computer to generate control information for a first carrier based upon a first user equipment (UE) identification (ID), generate control information for a second carrier based upon a second user equipment (UE) identification (ID), transmit control information for the first carrier using the first user equipment (UE) identification (ID) on an anchor carrier, and transmit control information for a second carrier using the second user equipment (UE) identification (ID) on the anchor carrier.

According to other aspects, a method that facilitates communicating control information for two or more carriers to a user equipment (UE) for cross-carrier operation. The method can comprise receiving a first user equipment (UE) identification (ID) corresponding to a first carrier for a user equipment (UE). Further, the method can comprise receiving a second user equipment (UE) identification (ID) corresponding to a second carrier for the user equipment (UE). Moreover, the method can include communicating control information for the first carrier and the second carrier via an anchor carrier, wherein the control information for each carrier is identified by a corresponding user equipment (UE) identification (ID).

Another aspect relates to a wireless communications apparatus. The wireless communications apparatus can include at least one processor configured to receive control information for a first carrier using a first user equipment (UE) identification (ID) on an anchor carrier, receive control information for a second carrier using a second user equipment (UE) identification (ID) on the anchor carrier, and utilize the control information for a cross-carrier operation. Further, the wireless communications apparatus can include memory coupled to the at least one processor.

Another aspect relates to a wireless communications apparatus that identifies control information for a plurality of carriers. The wireless communications apparatus can comprise means for receiving a first user equipment (UE) identification (ID) corresponding to a first carrier for a user equipment (UE). Moreover, the wireless communications apparatus can comprise means for receiving a second user equipment (UE) identification (ID) corresponding to a second carrier for the user equipment (UE). Further, the wireless communications apparatus can include means for communicating control information for the first carrier and the second carrier via an anchor carrier, wherein the control information for each carrier is identified by a corresponding user equipment (UE) identification (ID).

Still another aspect relates to a computer program product comprising a computer-readable medium having stored thereon code for causing at least one computer to receive control information for a first carrier using a first user equipment (UE) identification (ID) on an anchor carrier, receive control information for a second carrier using a second user equipment (UE) identification (ID) on the anchor carrier, and utilize the control information for a cross-carrier operation.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

BRIEF DESCRIPTION OF THE DRAWINGS

FIG. 11 is an illustration of an example system that communicates control information for two or more carriers to a user equipment (UE) for cross-carrier operation in a wireless communication environment.

DETAILED DESCRIPTION

Figure 1:
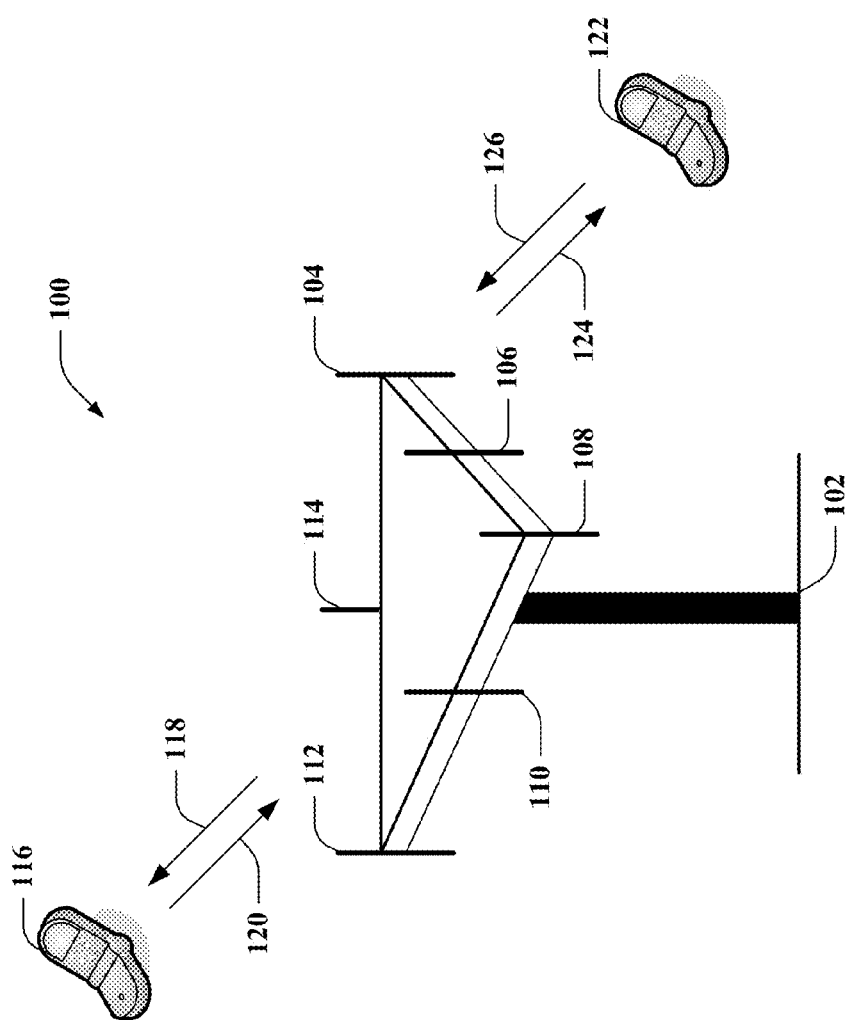
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "module," "carrier," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Moreover, various aspects or features described herein can be implemented as a method, apparatus, or article of manufacture using standard programming and/or engineering techniques. The term "article of manufacture" as used herein is intended to encompass a computer program accessible from any computer-readable device, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, various media capable of storing and/or containing instruction(s) and/or data.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, . . . ). For instance, base station 102 can utilize a particular technology for communicating with mobile devices (e.g., mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting-Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a CarrierIndex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

The subject innovation can employ identifications (IDs) for each carrier in a multi-carrier system or environment, in which such identifications (IDs) can be utilized to identify control information related to each carrier. In other words, a user equipment can assign user equipment (UE) identifications (IDs) for two or more carriers, wherein each user equipment (UE) identification (ID) corresponds to a particular carrier. In particular, a user equipment (UE) can assign identifications (IDs) for two or more carriers and upon receipt of control information from an anchor carrier, the user equipment (UE) can determine which control information relates to which carrier.

Figure 2:
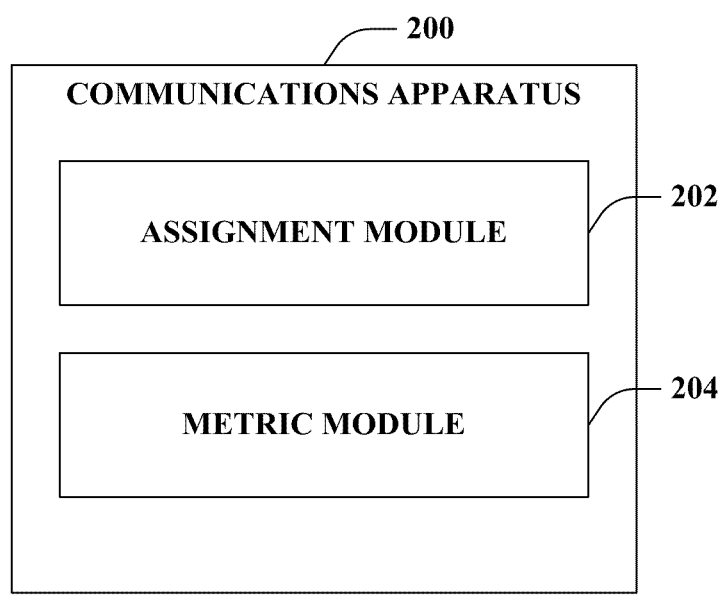
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In communications systems, the communications apparatus 200 employ components described below to facilitate identifying control information for two or more carriers utilizing corresponding identifications (IDs).

The communications apparatus 200 can include an assignment module 202 that can assign or relate an identification (ID) to each carrier within a multi-carrier system or environment. For example, the assignment module 202 can assign a user equipment (UE) identification (ID) for each carrier, wherein the user equipment (UE) identification (ID) can be a Cell Random Network Temporary Identity (C-RNTI). It is to be appreciated that the communications apparatus 200 can communicate such identifications (IDs) for each carrier to a base station, a serving base station, a target base station, a network, a server, an eNodeB, and the like.

The communications apparatus 200 can further include a metric module 204 that can receive control information and utilize the assigned user equipment (UE) identifications (IDs) to identify which control information corresponds to which carrier. For example, control information can be received for a first carrier and a second carrier from an anchor carrier. Based on the assigned user equipment (UE) identifications (IDs), the communications apparatus 200 can identify which control information relates to the first carrier and which control information relates to the second carrier. In other words, the metric module 204 can leverage the assigned IDs for each carrier to convey which control information relates to which carrier.

In a multicarrier system, a cross-carrier operation may be needed to provide good system performance. In harsh interference scenarios, control connectivity on impacted carriers is not just unreliable but absent, and prevents any data transmissions on these carriers. The cross-carrier operation assumes that the control channel sent on one carrier can convey control information for other carriers. The control can be reliably transmitted on one (anchor) carrier providing the control for other carriers. While no new DCI (control) formats are needed when Rel-8 single carrier control approach is considered, there has to be a way for a UE to make a distinction for which carrier the received control is applicable. The problem of making a distinction for which carrier the received control is applicable can be solved by using different C-RNTI (UE ID) for each carrier.

For interaction between cross-carrier Physical Downlink Control Channel (PDCCH) signalling and H-ARQ related to Downlink and Uplink, the following can be employed: 1) PDSCH and Physical Uplink Shared Channel (PUSCH) transmissions are on the same component carrier for Hybrid Automatic Repeat Request (H-ARQ) transmissions of the same transport block; and 2) PDCCH signalling for Physical Downlink Shared Channel (PDSCH) and/or PUSCH for H-ARQ transmissions of the same transport block. For the second, a first option can be: on the same component carrier and a second option can be: may be different component carriers.

Moreover, although not shown, it is to be appreciated that communications apparatus 200 can include memory that retains instructions with respect to assigning a first identification (ID) to a user equipment (UE) corresponding to a first carrier, assigning a second identification (ID) to the user equipment (UE) corresponding to a second carrier, receiving control information from an anchor carrier, utilizing the assigned first identification (ID) to identify control information for the first carrier, utilizing the assigned second identification (ID) to identify control information for the second carrier, and the like. Further, communications apparatus 200 can include a processor that may be utilized in connection with executing instructions (e.g., instructions retained within memory, instructions obtained from a disparate source, . . . ).

Additionally, although not shown, it is to be appreciated that communications apparatus 200 can include memory that retains instructions with respect to receiving a first user equipment (UE) identification (ID) corresponding to a first carrier for a user equipment (UE), receiving a second user equipment (UE) identification (ID) corresponding to a second carrier for the user equipment (UE), communicating control information for the first carrier and the second carrier via an anchor carrier, wherein the control information for each carrier is identified by a corresponding user equipment (UE) identification (ID), and the like. Further, communications apparatus 200 can include a processor that may be utilized in connection with executing instructions (e.g., instructions retained within memory, instructions obtained from a disparate source, . . . ).

Figure 3:
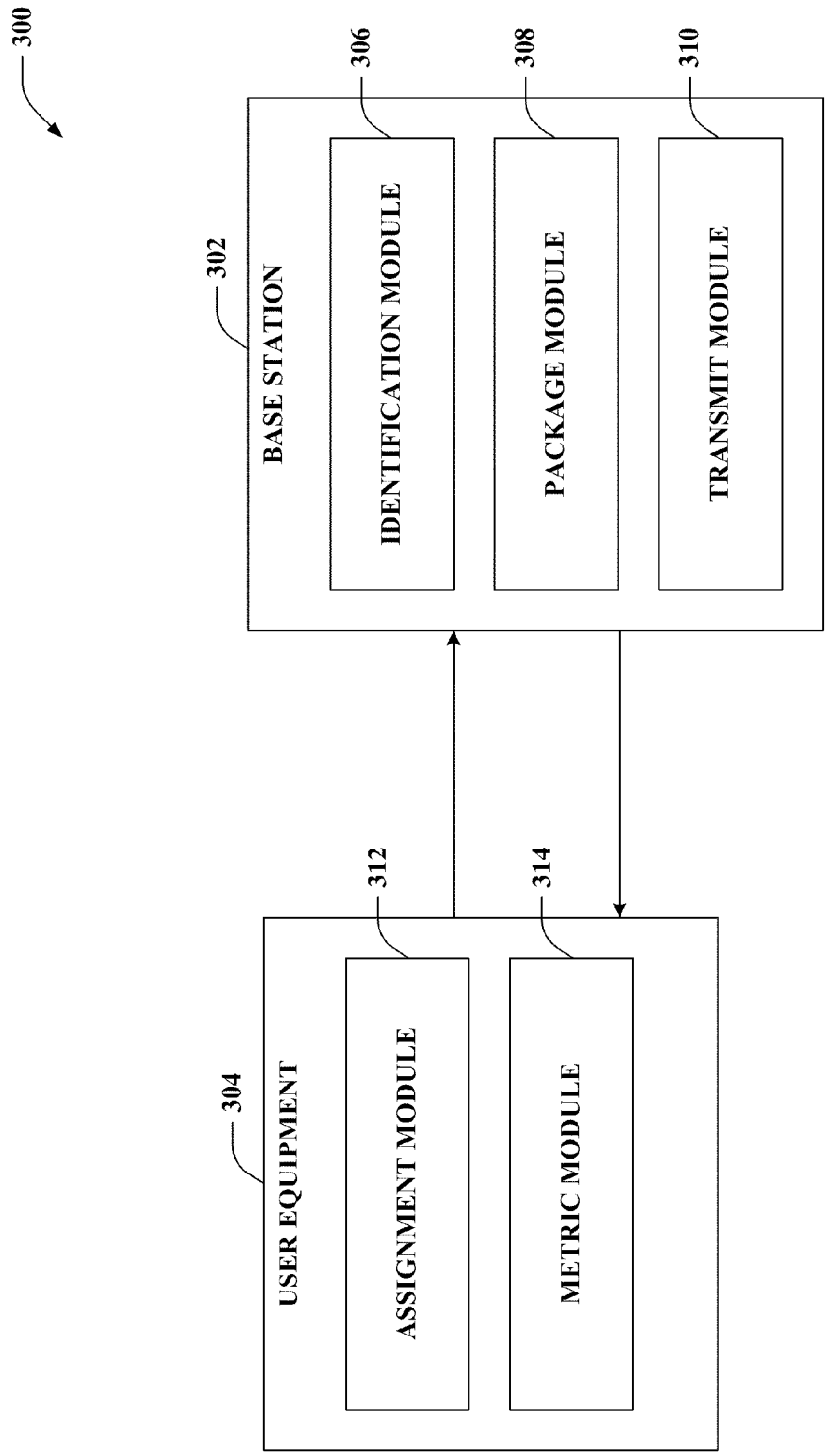
FIG. 3 is an illustration of an example wireless communications system that facilitates identifying control information for a user equipment related to a plurality of carriers.

Now referring to FIG. 3, illustrated is a wireless communications system 300 that can provide identification of control information for a user equipment related to a plurality of carriers. The system 300 includes a base station 302 that communicates with a mobile device 304 (and/or any number of disparate mobile devices (not shown)). Base station 302 can transmit information to mobile device 304 over a forward link channel; further base station 302 can receive information from mobile device 304 over a reverse link channel. Moreover, system 300 can be a MIMO system. Additionally, the system 300 can operate in an OFDMA wireless network, a 3GPP LTE wireless network, etc. Also, the components and functionalities shown and described below in the base station 302 can be present in the mobile device 304 as well and vice versa, in one example; the configuration depicted excludes these components for ease of explanation.

Base station 302 includes an identification module 306 that can receive identification (ID) assignments from the user equipment 304. In particular, the user equipment 304 can communicate the carrier-specific identification (ID) and the identification module 306 can utilize such identifications (IDs) in order to determine which control information corresponds to each carrier. For example, the identification module 306 can receive carrier-specific identifications that are Cell Random Network Temporary Identity (C-RNTI). The base station 302 can further include a package module 308 that can accumulate or generate a package of control information to the user equipment 304, wherein the control information relates to two or more carriers within a multi-carrier environment or system. It is to be appreciated that the control information can relate to Physical Downlink Control Channel (PDCCH). The base station 302 can further include a transmit module 310 that can communicate the packaged control information to the user equipment 304 in which the package control information includes control information for two or more carriers.

The user equipment 304 can include an assignment module 312 that can assign user equipment (UE) identification (ID) for each carrier in order to designate such identification (ID) to each carrier to determine which control information relates to each carrier. For instance, the assignment module 312 can assign the user equipment 304 a Cell Random Network Temporary Identity (C-RNTI) for each carrier. In an example, a first C-RNTI can be assigned to the UE and relate to a first carrier, a second C-RNTI can be assigned to the UE and relate to a second carrier, and a third C-RNTI can be assigned to the UE and relate to a third carrier. Thus, control information for each of the carriers can be sorted and identified based upon the corresponding C-RNTI.

The user equipment 304 can further include a metric module 314 that can evaluate received control information in order to identify which portions of the control information correspond to which carrier. The metric module 314 can utilize the assigned identifications in order to configure the user equipment 304 and convey the identifications to the user equipment 304.

Moreover, although not shown, it is to be appreciated that base station 302 can include memory that retains instructions with respect to assigning a first identification (ID) to a user equipment (UE) corresponding to a first carrier, assigning a second identification (ID) to the user equipment (UE) corresponding to a second carrier, receiving control information from an anchor carrier, utilizing the assigned first identification (ID) to identify control information for the first carrier, utilizing the assigned second identification (ID) to identify control information for the second carrier, and the like. Further, communications apparatus 200 can include a processor that may be utilized in connection with executing instructions (e.g., instructions retained within memory, instructions obtained from a disparate source, . . . ).

Additionally, although not shown, it is to be appreciated that base station 302 can include memory that retains instructions with respect to receiving a first user equipment (UE) identification (ID) corresponding to a first carrier for a user equipment (UE), receiving a second user equipment (UE) identification (ID) corresponding to a second carrier for the user equipment (UE), communicating control information for the first carrier and the second carrier via an anchor carrier, wherein the control information for each carrier is identified by a corresponding user equipment (UE) identification (ID), and the like. Further, communications apparatus 200 can include a processor that may be utilized in connection with executing instructions (e.g., instructions retained within memory, instructions obtained from a disparate source, . . . ).

Figure 4:
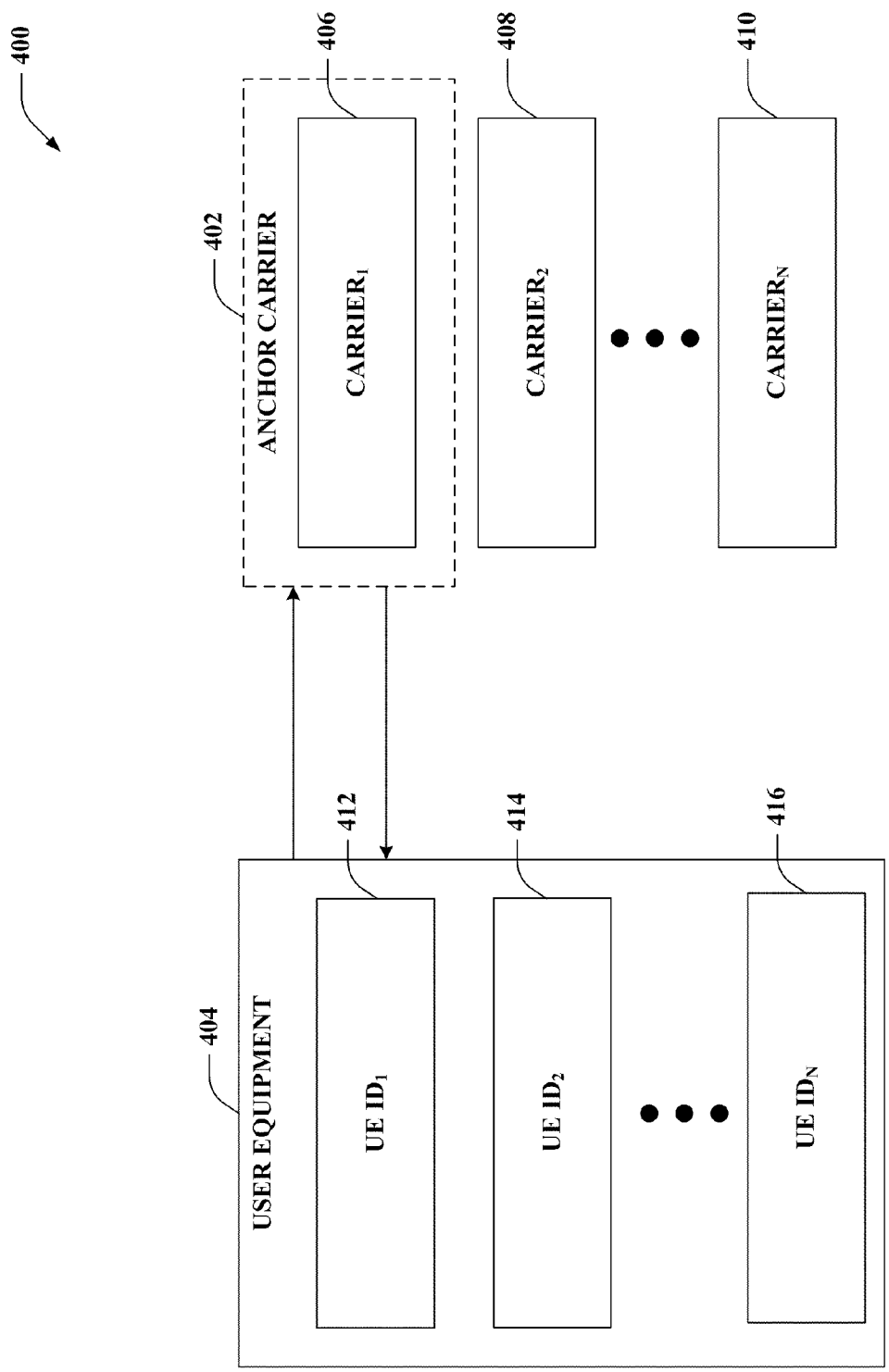
FIG. 4 is an illustration of an example system that facilitates assigning an identification (ID) for each carrier.

Now referring to FIG. 4, an example wireless communications system 400 can provide assignment of an identification (ID) for each carrier. The system 400 can include a user equipment 404 that can leverage multiple carriers (e.g., a carrier can include an amount of resources or a collection of resources, an amount of bandwidth, etc.) such as carrier$_1$ 406, carrier$_2$ 408, and carrier$_N$ 410. It is to be appreciated that there can be any suitable number of carriers such as carrier$_1$ 406 to carrier$_N$ 410, where N is a positive integer. Within multi-carrier operation, an anchor carrier 402 can be utilized to communicate information related to two or more carriers. In the system 400, carrier$_1$ 406 is the anchor carrier 402 that can communicate information related to at least two or more carriers.

In accordance with an aspect of the subject innovation, the user equipment 404 can assign specific identifications for each carrier in order to identify control information related to each carrier. Thus, the user equipment 404 can assign a UE ID$_1$ 412 to a first carrier, a UE ID$_2$ 414 to a second carrier, and the like. It is to be appreciated that the user equipment 404 can assign any suitable number of UE IDs to any suitable number of carriers, such as UE ID$_1$ to UE ID$_N$, where N is a positive integer. With the user equipment 404 having a UE ID for each carrier, received control information can be sorted and identified so that the user equipment 404 can ascertain which control information relates to which carrier.

Figure 5:
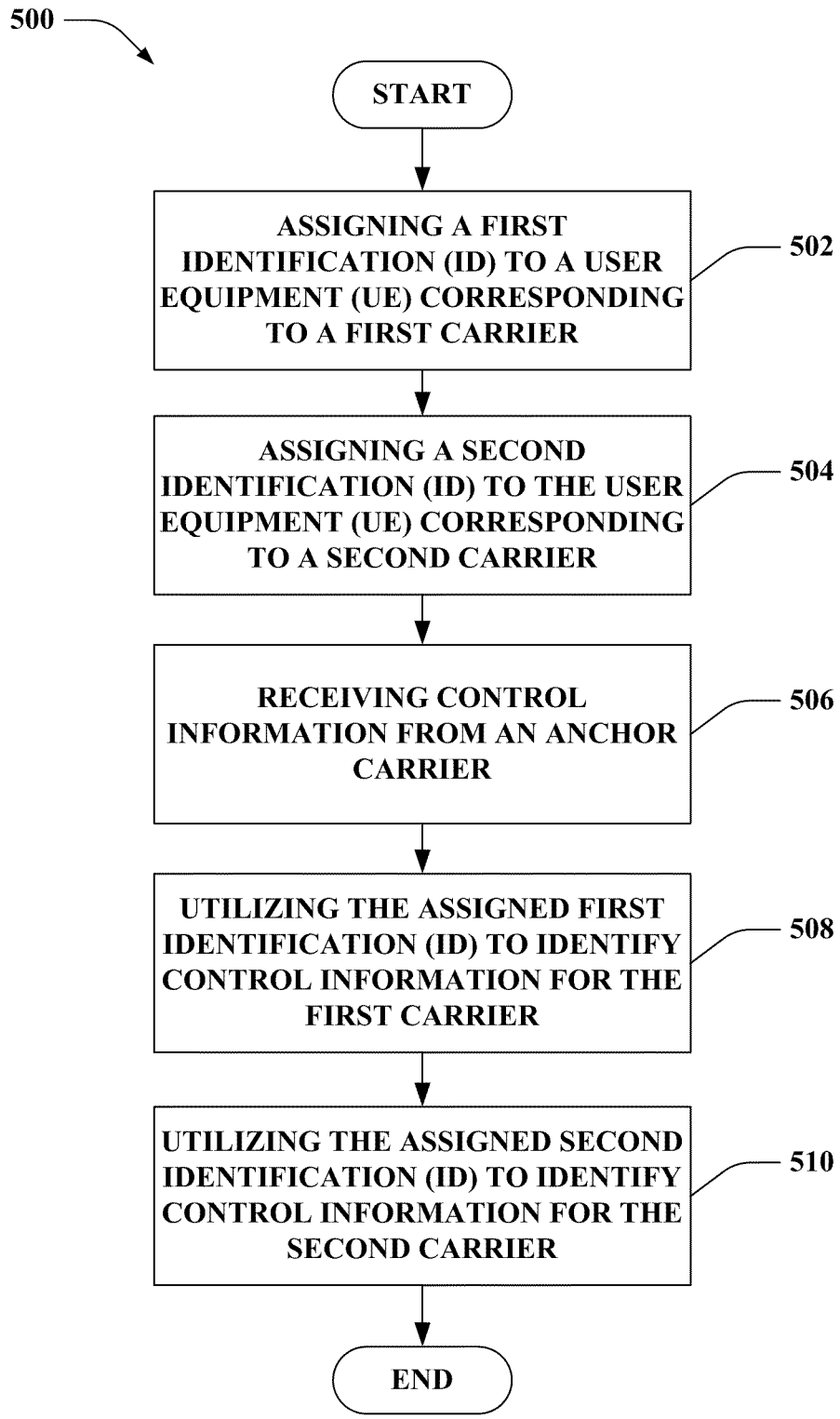
FIG. 5 is an illustration of an example methodology that facilitates identifying control information related to cross-carrier operation.
Figure 6:
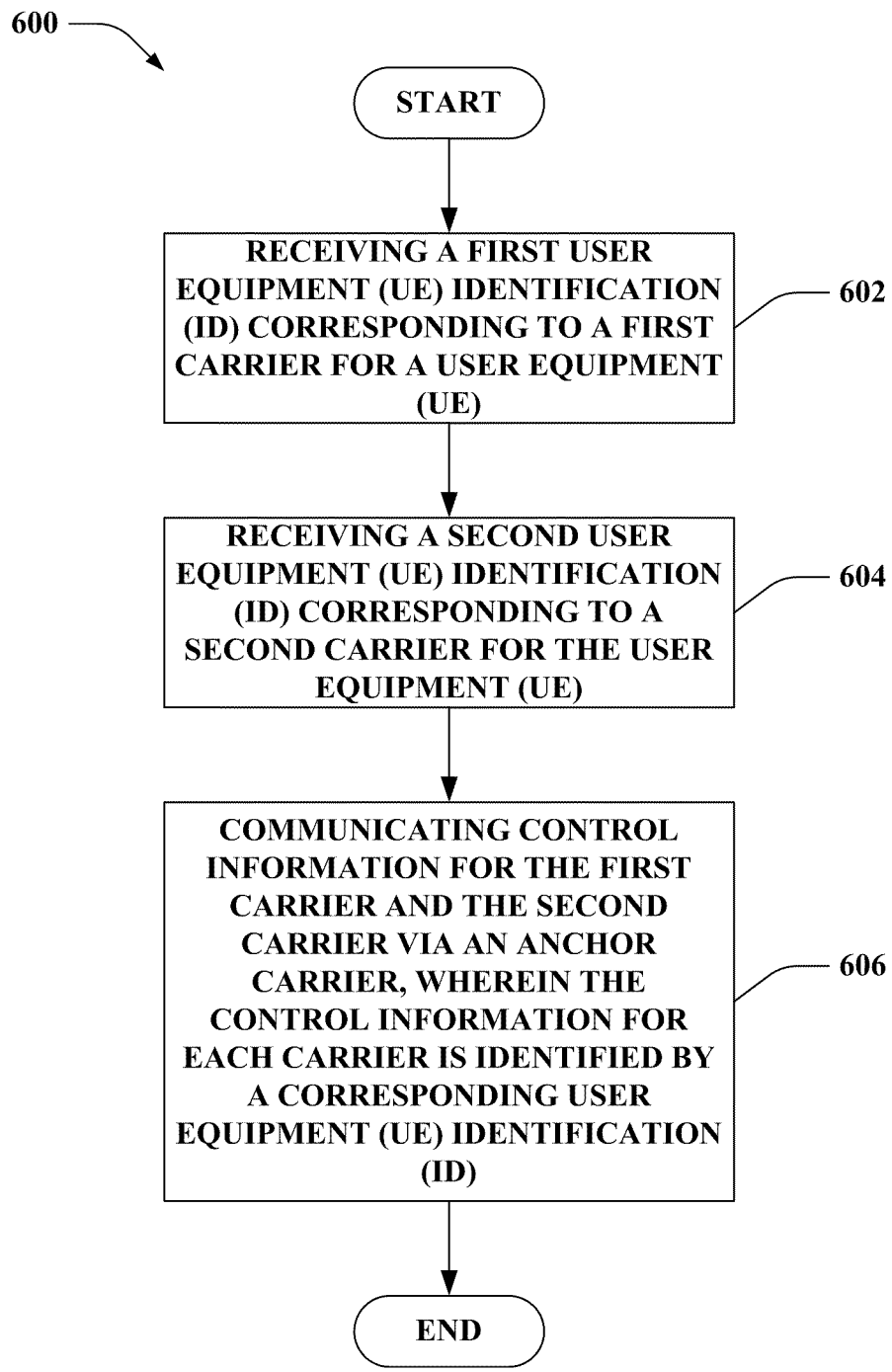
FIG. 6 is an illustration of an example methodology that facilitates communicating control information for two or more carriers to a user equipment (UE) for cross-carrier operation.

Referring to FIGS. 5-6, methodologies relating to providing uplink timing control while reducing overhead and power consumption are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

In accordance with an aspect of the subject innovation, the user equipment 404 can assign specific identifications for each carrier in order to identify control information related to each carrier. Thus, the user equipment 404 can assign a UE ID$_1$ 412 to a first carrier, a UE ID$_2$ 414 to a second carrier, and the like. It is to be appreciated that the user equipment 404 can assign any suitable number of UE IDs to any suitable number of carriers, such as UE ID$_1$ 412 to UE ID$_N$ 416, where N is a positive integer. With the user equipment 404 having a UE ID for each carrier, received control information can be sorted and identified so that the user equipment 404 can ascertain which control information relates to which carrier.

Now referring to FIG. 6, a methodology 600 that facilitates communicating control information for two or more carriers to a user equipment (UE) for cross-carrier operation. At reference numeral 602, a first user equipment (UE) identification (ID) corresponding to a first carrier for a user equipment (UE) can be received. At reference numeral 604, a second user equipment (UE) identification (ID) corresponding to a second carrier for the user equipment (UE) can be received. At reference numeral 606, control information for the first carrier and the second carrier can be communicated via an anchor carrier, wherein the control information for each carrier is identified by a corresponding user equipment (UE) identification (ID).

Figure 7:
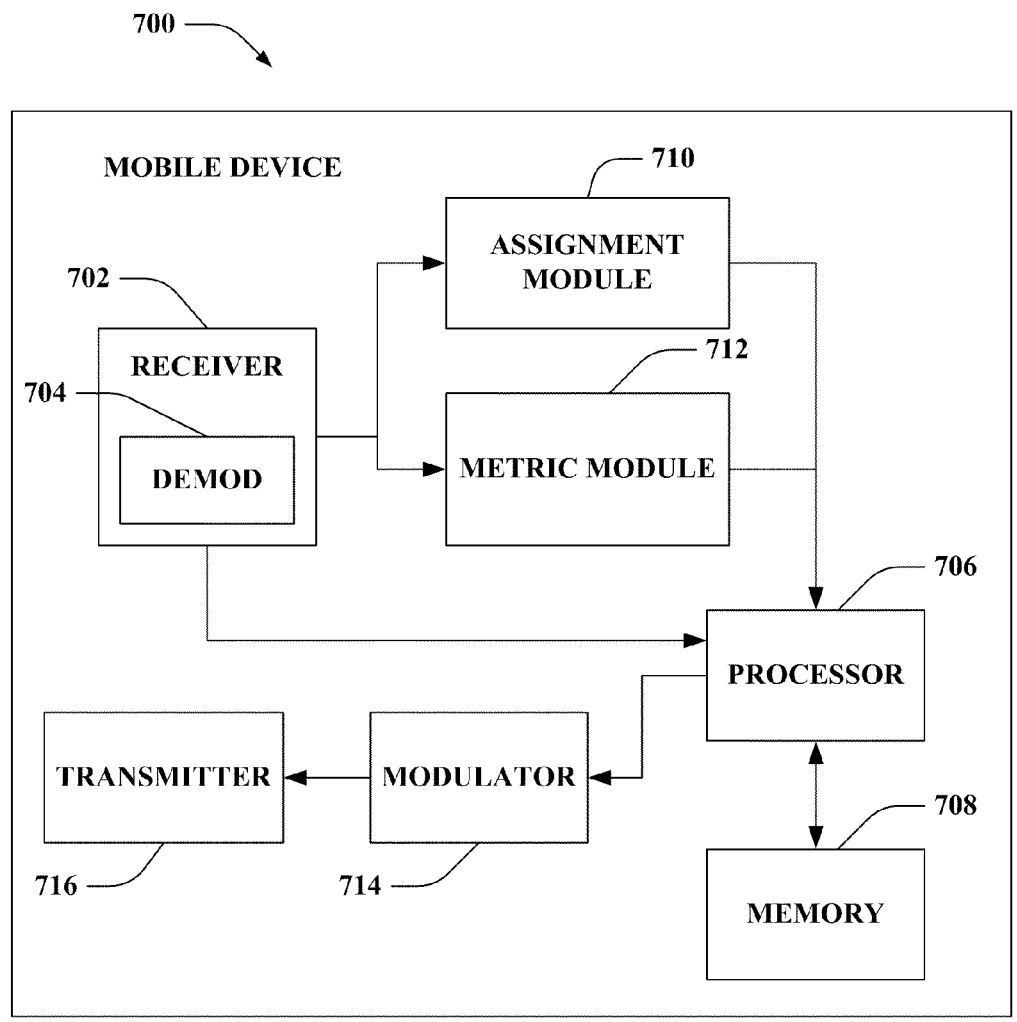
FIG. 7 is an illustration of an example mobile device that facilitates assigning identification (ID) for each carrier in a wireless communication system.

FIG. 7 is an illustration of a mobile device 700 that facilitates assigning identification (ID) for each carrier in a wireless communication system. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to an assignment module 710 and/or a metric module 712. The assignment module 710 can employ a user equipment (UE) identification (ID) for the mobile device 700, wherein the user equipment (UE) identification (ID) corresponds to a carrier in a multi-carrier environment. The metric module 712 can leverage the user equipment (UE) identification (ID) in order to configure and convey to the mobile device 700 which control information corresponds to which carrier.

Mobile device 700 still further comprises a modulator 714 and transmitter 716 that respectively modulate and transmit signals to, for instance, a base station, another mobile device, etc. Although depicted as being separate from the processor 606, it is to be appreciated that the assignment module 710, metric module 712, demodulator 704, and/or modulator 714 can be part of the processor 706 or multiple processors (not shown).

Figure 8:
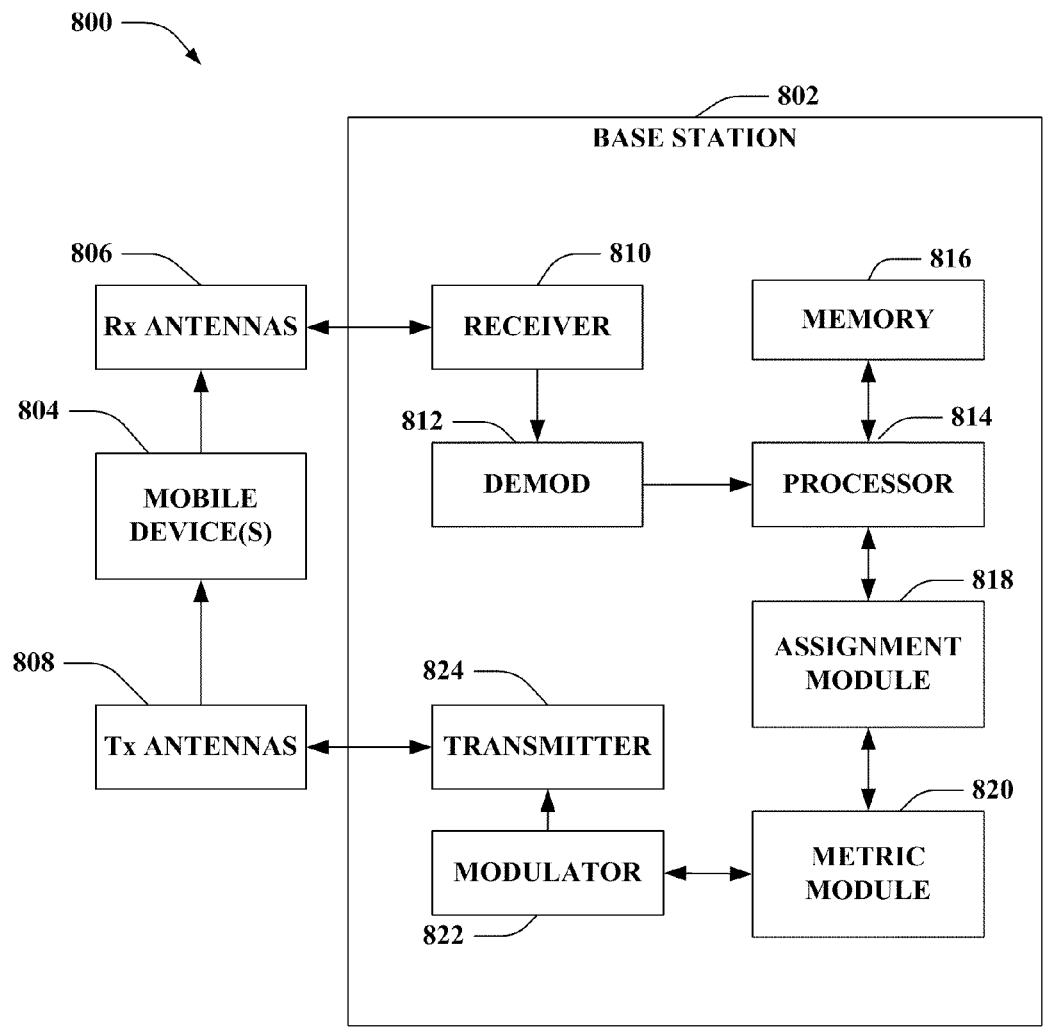
FIG. 8 is an illustration of an example system that facilitates conveying control information for each carrier based on assigned identifications (IDs) in a wireless communication environment.

FIG. 8 is an illustration of a system 800 that facilitates conveying control information for each carrier based on assigned identifications (IDs) in a wireless communication environment as described supra. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein.

Processor 814 is further coupled to an assignment module 818 and/or a metric module 820. The assignment module 818 can assign an ID for each carrier within a multi-carrier environment. The metric module 820 can leverage the ID to identify control information for each carrier, wherein the control information is received via an anchor carrier with control information for two or more carriers. Furthermore, although depicted as being separate from the processor 814, it is to be appreciated that the timing adjustment determiner 818, timing adjustment evaluator 820, demodulator 812, and/or modulator 822 can be part of the processor 814 or multiple processors (not shown).

Figure 9:
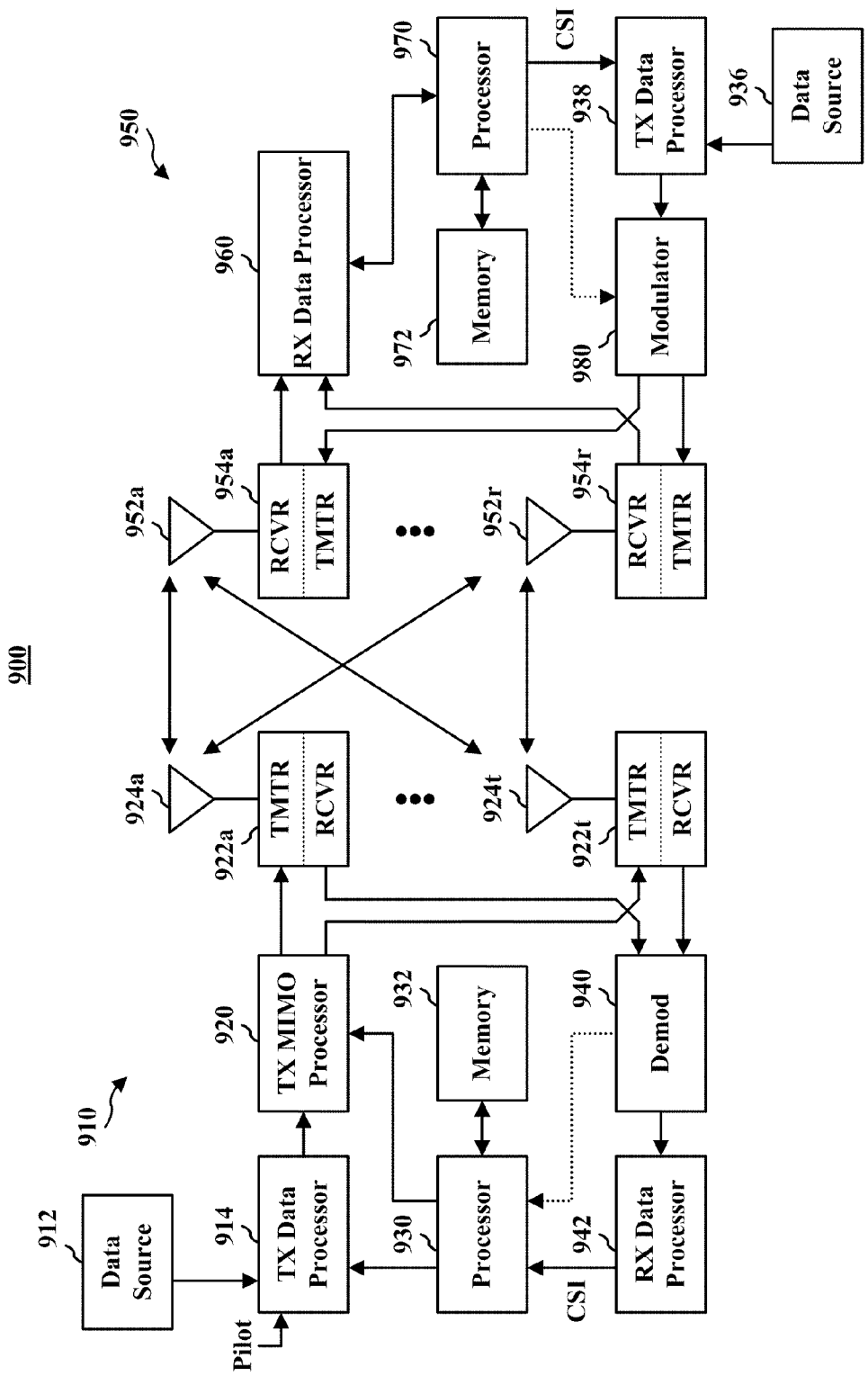
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), techniques/configurations (FIG. 4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from N$_T$ antennas 924a through 924t, respectively.

At mobile device 950, the transmitted modulated signals are received by N$_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the N$_R$ received symbol streams from N$_R$ receivers 954 based on a particular receiver processing technique to provide N$_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
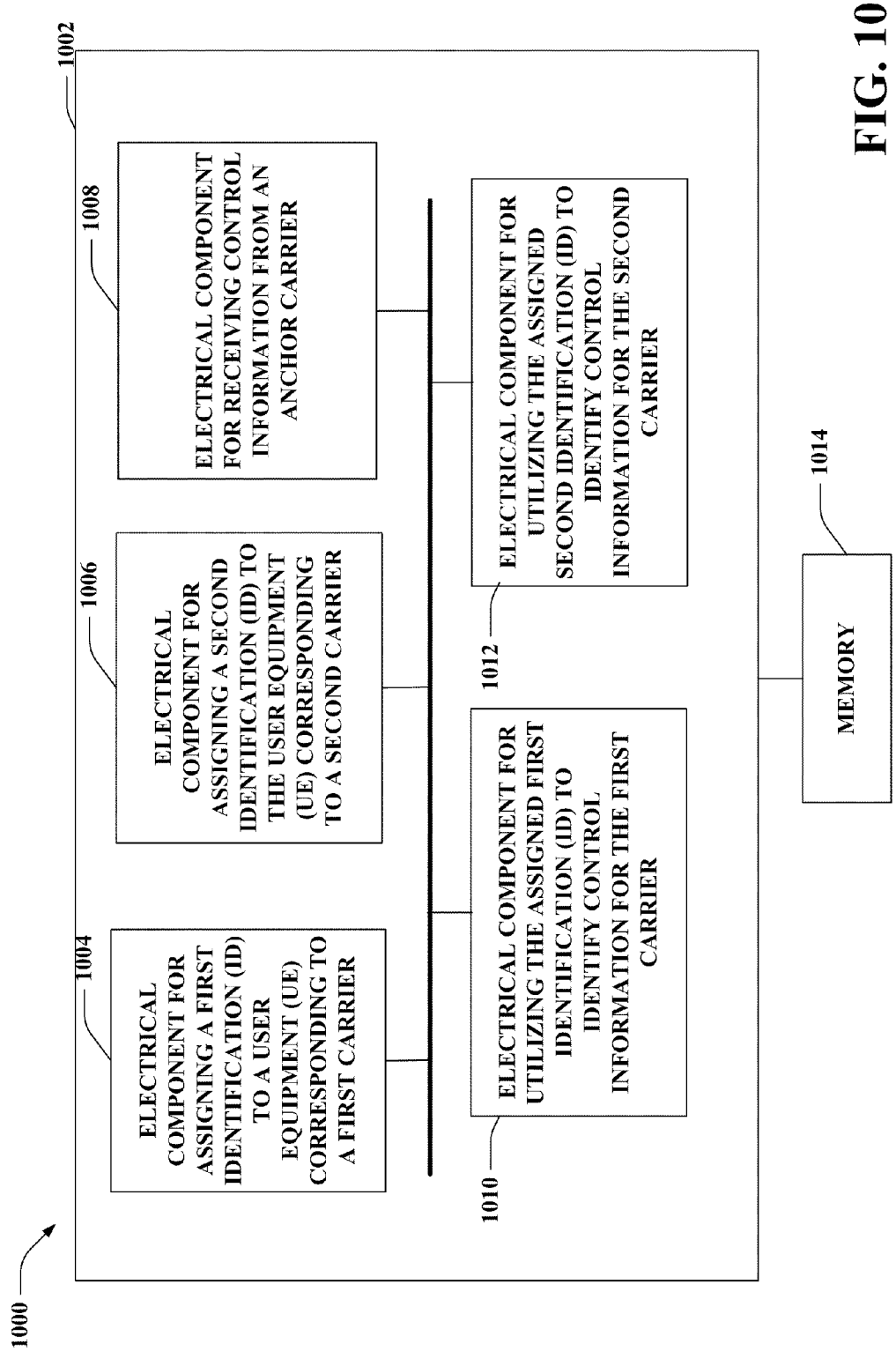
FIG. 10 is an illustration of an example system that facilitates identifying control information related to cross-carrier operation.

With reference to FIG. 10, illustrated is a system 1000 that identifies control information related to cross-carrier operation. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. The logical grouping 1002 can include an electrical component for assigning a first identification (ID) to a user equipment (UE) corresponding to a first carrier 1004. In addition, the logical grouping 1002 can comprise an electrical component for assigning a second identification (ID) to the user equipment (UE) corresponding to a second carrier 1006. Moreover, the logical grouping 1002 can include an electrical component for receiving control information from an anchor carrier 1008. The logical grouping 1002 can include an electrical component for utilizing the assigned first identification (ID) to identify control information for the first carrier 1010. Furthermore, the logical grouping 1002 can include an electrical component for utilizing the assigned second identification (ID) to identify control information for the second carrier 1012. Additionally, system 1000 can include a memory 1014 that retains instructions for executing functions associated with electrical components 1004, 1006, 1008, 1010, and 1012. While shown as being external to memory 1014, it is to be understood that one or more of electrical components 1004, 1006, 1008, 1010, and 1012 can exist within memory 1014.

Turning to FIG. 11, illustrated is a system 1100 that communicates control information for two or more carriers to a user equipment (UE) for cross-carrier operation in a wireless communications network. System 1100 can reside within a base station, mobile device, etc., for instance. As depicted, system 1100 includes functional blocks that can represent functions implemented by a processor, software, or combination thereof (e.g., firmware). System 1100 includes a logical grouping 1102 of electrical components that facilitate communicating control information for two or more carriers. Logical grouping 1102 can include an electrical component for receiving a first user equipment (UE) identification (ID) corresponding to a first carrier for a user equipment (UE) 1104. Moreover, logical grouping 1102 can include an electrical component for receiving a second user equipment (UE) identification (ID) corresponding to a second carrier for the user equipment (UE) 1106. Further, logical grouping 1102 can comprise an electrical component for communicating control information for the first carrier and the second carrier via an anchor carrier, wherein the control information for each carrier is identified by a corresponding user equipment (UE) identification (ID) 1108. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method used in a wireless communications system that facilitates identifying control information related to cross-carrier operation, comprising:
    assigning, by a user equipment (UE), a first identification (ID) to the user equipment (UE) corresponding to a first carrier;
    assigning, by the user equipment (UE), a second identification (ID) to the user equipment (UE) corresponding to a second carrier;
    communicating, to a base station, ID assignments from the user equipment (UE), including the first ID and the second ID;
    receiving control information from an anchor carrier;
    utilizing the assigned first identification (ID) to identify control information for the first carrier; and
    utilizing the assigned second identification (ID) to identify control information for the second carrier,
    wherein the first identification (ID) and the second identification (ID) are specific identifications for each of the first carrier and the second carrier,
    wherein the first identification (ID) is a first Cell Random Network Temporary Identity (C-RNTI) and the second identification (ID) is a second Cell Random Network Temporary Identity (C-RNTI).

2. The method of claim 1, wherein the control information relates to Physical Downlink Control Channel (PDCCH).

3. The method of claim 1, further comprising assigning an identification (ID) for each carrier for a cross-carrier operation.

4. The method of claim 3, wherein the control information for a plurality of carriers is communicated by the anchor carrier and the identification for each carrier is utilized to associate control information for each carrier for the user equipment.

5. The method of claim 1, further comprising transmitting Physical Uplink Shared Channel (PUSCH) on the same carrier for all Hybrid Automatic Repeat Request (H-ARQ) transmissions of a transport block.

6. The method of claim 1, further comprising configuring the user equipment (UE) with the control information based upon the first identification (ID) and the second identification (ID).

7. The method of claim 1, further comprising transmitting Physical Downlink Shared Channel (PDSCH) on the same carrier for all Hybrid Automatic Repeat Request (H-ARQ) transmissions of a transport block.

8. The method of claim 1, further comprising utilizing the anchor carrier for Physical Downlink Control Channel (PDCCH) signaling for Physical Downlink Shared Channel (PDSCH) and Physical Uplink Shared Channel (PUSCH) for Hybrid Automatic Repeat Request (H-ARQ) transmissions of the same transport block.

9. The method of claim 1, further comprising utilizing disparate carriers for Physical Downlink Control Channel (PDCCH) signaling for Physical Downlink Shared Channel (PDSCH) and Physical Uplink Shared Channel (PUSCH) for Hybrid Automatic Repeat Request (H-ARQ) transmissions of the same transport block.

10. A wireless communications apparatus, comprising:
    at least one processor configured to:
        receive identification (ID) assignments from a user equipment (UE), including a first user equipment (UE) identification (ID) and a second user equipment (UE) identification (ID) assigned by the user equipment (UE) to the user equipment (UE) and corresponding to a first carrier and a second carrier;
        generate control information for the first carrier based upon the first user equipment (UE) identification (ID);
        generate control information for the second carrier based upon the second user equipment (UE) identification (ID);
        transmit control information for the first carrier using the first user equipment (UE) identification (ID) on an anchor carrier;
        transmit control information for the second carrier using the second user equipment (UE) identification (ID) on the anchor carrier; and
    a memory coupled to the at least one processor,
    wherein the first user equipment (UE) identification (ID) and the second user equipment (UE) identification (ID) are specific identifications for each of the first carrier and the second carrier,
    wherein the first user equipment (UE) identification (ID) is a first Cell Random Network Temporary Identity (C-RNTI) and the second user equipment (UE) identification (ID) is a second Cell Random Network Temporary Identity (C-RNTI).

11. The wireless communications apparatus of claim 10, further comprising at least one processor configured to utilizing the control information for a cross-carrier operation.

12. A wireless communications apparatus that identifies control information, comprising:
    means for assigning, by a user equipment (UE), a first identification (ID) to the user equipment (UE) corresponding to a first carrier;
    means for assigning, by a user equipment (UE), a second identification (ID) to the user equipment (UE) corresponding to a second carrier;
    means for communicating to a base station, by the user equipment, identification (ID) assignments including the first identification (ID) and the second identification (ID);
    means for receiving control information from an anchor carrier;
    means for utilizing the assigned first identification (ID) to identify control information for the first carrier; and
    means for utilizing the assigned second identification (ID) to identify control information for the second carrier,
    wherein the first identification (ID) and the second identification (ID) are specific identifications for each of the first carrier and the second carrier,
    wherein the first identification (ID) is a first Cell Random Network Temporary Identity (C-RNTI) and the second identification (ID) is a second Cell Random Network Temporary Identity (C-RNTI).

13. The wireless communications apparatus of claim 12, wherein the control information relates to Physical Downlink Control Channel (PDCCH).

14. The wireless communications apparatus of claim 12, further comprising means for assigning an identification (ID) for each carrier for a cross-carrier operation.

15. The wireless communications apparatus of claim 14, wherein the control information for a plurality of carriers is communicated by the anchor carrier and the identification for each carrier is utilized to associate control information for each carrier for the user equipment.

16. The wireless communications apparatus of claim 12, further comprising means for transmitting Physical Uplink Shared Channel (PUSCH) on the same carrier for all Hybrid Automatic Repeat Request (H-ARQ) transmissions of a transport block.

17. The wireless communications apparatus of claim 12, further comprising means for configuring the user equipment (UE) with the control information based upon the first identification (ID) and the second identification (ID).

18. The wireless communications apparatus of claim 12, further comprising means for transmitting Physical Downlink Shared Channel (PDSCH) and Physical Uplink Shared Channel (PUSCH) on the anchor carrier for Hybrid Automatic Repeat Request (H-ARQ) transmissions of a transport block.

19. The wireless communications apparatus of claim 12 further comprising means for utilizing the anchor carrier for Physical Downlink Control Channel (PDCCH) signaling for Physical Downlink Shared Channel (PDSCH) for Hybrid Automatic Repeat Request (H-ARQ) transmissions of the same transport block.

20. The wireless communications apparatus of claim 12, further comprising means for utilizing disparate carriers for Physical Downlink Control Channel (PDCCH) signaling for Physical Downlink Shared Channel (PDSCH) and Physical Uplink Shared Channel (PUSCH) for Hybrid Automatic Repeat Request (H-ARQ) transmissions of the same transport block.

21. A computer program product, comprising:
a non-transitory computer-readable medium comprising:
code for causing at least one computer to receive identification (ID) assignments from a user equipment (UE), including a first user equipment (UE) identification (ID) and a second user equipment (UE) identification (ID) assigned by the user equipment (UE) to the user equipment (UE) and corresponding to a first carrier and a second carrier;
code for causing at least one computer to generate control information for the first carrier based upon the first user equipment (UE) identification (ID);
code for causing at least one computer to generate control information for the second carrier based upon the second user equipment (UE) identification (ID);
code for causing at least one computer to transmit control information for the first carrier using the first user equipment (UE) identification (ID) on an anchor carrier; and
code for causing at least one computer to transmit control information for the second carrier using the second user equipment (UE) identification (ID) on the anchor carrier,
wherein the first user equipment (UE) identification (ID) and the second user equipment (UE) identification (ID) are specific identifications for each of the first carrier and the second carrier,
wherein the first user equipment (UE) identification (ID) is a first Cell Random Network Temporary Identity (C-RNTI) and the second user equipment (UE) identification (ID) is a second Cell Random Network Temporary Identity (C-RNTI).

22. A method used in a wireless communications system that facilitates communicating control information for two or more carriers to a user equipment (UE) for cross-carrier operation, comprising:
receiving, from a user equipment (UE), a first user equipment (UE) identification (ID) assigned by the user equipment (UE) to the user equipment (UE) and corresponding to a first carrier for the user equipment (UE);
receiving, from the user equipment (UE), a second user equipment (UE) identification (ID) assigned by the user equipment (UE) to the user equipment (UE) and corresponding to a second carrier for the user equipment (UE); and
communicating control information for the first carrier and the second carrier via an anchor carrier, wherein the control information for each carrier is identified by a corresponding user equipment (UE) identification (ID),
wherein the first user equipment (UE) identification (ID) and the second user equipment (UE) identification (ID) are specific identifications for each of the first carrier and the second carrier,
wherein the first user equipment (UE) identification (ID) is a first Cell Random Network Temporary Identity (C-RNTI) and the second user equipment (UE) identification (ID) is a second Cell Random Network Temporary Identity (C-RNTI).

23. The method of claim 22, wherein the control information relates to Physical Downlink Control Channel (PDCCH).

24. The method of claim 22, further comprising receiving the control information at the user equipment.

25. The method of claim 24, further comprising:
utilizing the first user equipment (UE) identification (ID) to identify control information for the first carrier; and
utilizing the second user equipment (UE) identification (ID) to identify control information for the second carrier.

26. The method of claim 22, further comprising configuring the user equipment (UE) with the control information based upon the first identification (ID) and the second identification (ID).

27. The method of claim 22, further comprising transmitting at least one of Physical Downlink Shared Channel (PDSCH) or Physical Uplink Shared Channel (PUSCH) on the anchor carrier for Hybrid Automatic Repeat Request (H-ARQ) transmissions of a transport block.

28. The method of claim 27, further comprising utilizing the anchor carrier for Physical Downlink Control Channel (PDCCH) signaling for Physical Downlink Shared Channel (PDSCH) and Physical Uplink Shared Channel (PUSCH) for Hybrid Automatic Repeat Request (H-ARQ) of the same transport block.

29. The method of claim 27, further comprising utilizing disparate carriers for Physical Downlink Control Channel (PDCCH) signaling for Physical Downlink Shared Channel (PDSCH) and Physical Uplink Shared Channel (PUSCH) for Hybrid Automatic Repeat Request (H-ARQ) of the same transport block.

30. The method of claim 22, wherein the control information for a plurality of carriers is communicated by the anchor carrier and the identification (ID) for each carrier is utilized to associate control information for each carrier for the user equipment.

31. A wireless communications apparatus, comprising:
at least one processor configured to:
assign, by a user equipment (UE), a first identification (ID) to the user equipment (UE) corresponding to a first carrier;
assign, by the user equipment (UE), a second identification (ID) to the user equipment (UE) corresponding to a second carrier;
communicate, to a base station, ID assignments from the user equipment (UE), including the first ID and the second ID;
receive control information for the first carrier using the first user equipment (UE) identification (ID) on an anchor carrier;
receive control information for the second carrier using the second user equipment (UE) identification (ID) on the anchor carrier;
utilize the control information for a cross-carrier operation; and
a memory coupled to the at least one processor,
wherein the first user equipment (UE) identification (ID) and the second user equipment (UE) identification (ID) are specific identifications for each of the first carrier and the second carrier,
wherein the first user equipment (UE) identification (ID) is a first Cell Random Network Temporary Identity (C-RNTI) and the second user equipment (UE) identification (ID) is a second Cell Random Network Temporary Identity (C-RNTI).

32. The wireless communications apparatus of claim 31, wherein the control information relates to Physical Downlink Control Channel (PDCCH).

33. A wireless communications apparatus that identifies control information, comprising:
means for receiving, from a user equipment (UE), a first user equipment (UE) identification (ID) assigned by the user equipment (UE) to the user equipment (UE) and corresponding to a first carrier for a user equipment (UE);
means for receiving, from the user equipment (UE), a second user equipment (UE) identification (ID) assigned by the user equipment (UE) to the user equipment (UE) and corresponding to a second carrier for the user equipment (UE);
means for communicating control information for the first carrier and the second carrier via an anchor carrier, wherein the control information for each carrier is identified by a corresponding user equipment (UE) identification (ID),
wherein the first user equipment (UE) identification (ID) and the second user equipment (UE) identification (ID) are specific identifications for each of the first carrier and the second carrier,
wherein the first user equipment (UE) identification (ID) is a first Cell Random Network Temporary Identity (C-RNTI) and the second user equipment (UE) identification (ID) is a second Cell Random Network Temporary Identity (C-RNTI).

34. The wireless communications apparatus of claim 33, wherein the control information relates to Physical Downlink Control Channel (PDCCH).

35. The wireless communications apparatus of claim 33, further comprising means for receiving the control information at the user equipment.

36. The wireless communications apparatus of claim 35, further comprising:
means for utilizing the first user equipment (UE) identification (ID) to identify control information for the first carrier; and
means for utilizing the second user equipment (UE) identification (ID) to identify control information for the second carrier.

37. The wireless communications apparatus of claim 33, further comprising means for transmitting at least one of Physical Downlink Shared Channel (PDSCH) or Physical Uplink Shared Channel (PUSCH) on the anchor carrier for Hybrid Automatic Repeat Request (H-ARQ) transmissions of a transport block.

38. The wireless communications apparatus of claim 33, further comprising means for utilizing the anchor carrier for Physical Downlink Control Channel (PDCCH) signaling for Physical Downlink Shared Channel (PDSCH) and Physical Uplink Shared Channel (PUSCH) for Hybrid Automatic Repeat Request (H-ARQ) of the same transport block.

39. The wireless communications apparatus of claim 33, further comprising means for utilizing disparate carriers for Physical Downlink Control Channel (PDCCH) signaling for Physical Downlink Shared Channel (PDSCH) and Physical Uplink Shared Channel (PUSCH) for Hybrid Automatic Repeat Request (H-ARQ) of the same transport block.

40. The wireless communications apparatus of claim 33, further comprising means for configuring the user equipment (UE) with the control information based upon the first identification (ID) and the second identification (ID).

41. The wireless communications apparatus of claim 33, wherein the control information for a plurality of carriers is communicated by the anchor carrier and the identification (ID) for each carrier is utilized to associate control information for each carrier for the user equipment.

42. A computer program product, comprising:
a non-transitory computer-readable medium comprising:
code for causing at least one computer to assign, by a user equipment (UE), a first identification (ID) to the user equipment (UE) corresponding to a first carrier;
code for causing at least one computer to assign, by the user equipment (UE), a second identification (ID) to the user equipment (UE) corresponding to a second carrier;
code for causing at least one computer to communicate, to a base station, ID assignments from the user equipment (UE), including the first ID and the second ID;
code for causing at least one computer to receive control information for the first carrier using the first user equipment (UE) identification (ID) on an anchor carrier;
code for causing at least one computer to receive control information for the second carrier using the second user equipment (UE) identification (ID) on the anchor carrier;
code for causing at least one computer to utilize the control information for a cross-carrier operation; and
a memory coupled to the at least one processor,
wherein the first user equipment (UE) identification (ID) and the second user equipment (UE) identification (ID) are specific identifications for each of the first carrier and the second carrier,
wherein the first user equipment (UE) identification (ID) is a first Cell Random Network Temporary Identity (C-RNTI) and the second user equipment (UE) identification (ID) is a second Cell Random Network Temporary Identity (C-RNTI).

43. The computer program product of claim 42, wherein the control information relates to Physical Downlink Control Channel (PDCCH).

* * * * *